United States Patent
Webb et al.

(10) Patent No.: US 10,373,237 B2
(45) Date of Patent: Aug. 6, 2019

(54) THREE-DIMENSIONAL OBJECT STORAGE, CUSTOMIZATION, AND PROCUREMENT SYSTEM

(71) Applicant: Accenture Global Services Limited, Dublin (IE)

(72) Inventors: Sunny Webb, San Francisco, CA (US); Matthew Short, San Jose, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1014 days.

(21) Appl. No.: 14/599,000

(22) Filed: Jan. 16, 2015

(65) Prior Publication Data

US 2016/0210312 A1 Jul. 21, 2016

(51) Int. Cl.
*B33Y 50/00* (2015.01)
*G06Q 30/06* (2012.01)

(52) U.S. Cl.
CPC .......... *G06Q 30/0635* (2013.01); *B33Y 50/00* (2014.12)

(58) Field of Classification Search
None
See application file for complete search history.

(56) References Cited

U.S. PATENT DOCUMENTS

| | | | |
|---|---|---|---|
| 6,621,589 B1 | 9/2003 | Al-Kazily et al. | |
| 6,687,018 B1 | 2/2004 | Leong et al. | |
| 6,714,915 B1 | 3/2004 | Barnard et al. | |
| 7,088,462 B2 | 8/2006 | Bhogal et al. | |
| 7,689,966 B2 | 3/2010 | Verma et al. | |
| 8,065,741 B1 | 11/2011 | Coblentz et al. | |
| 8,069,091 B1 | 11/2011 | Callen et al. | |
| 9,588,726 B2 | 3/2017 | Webb et al. | |
| 9,928,474 B1* | 3/2018 | Evans | G06Q 10/083 |
| 2001/0037368 A1* | 11/2001 | Huang | G06Q 30/0601 709/204 |
| 2002/0019786 A1* | 2/2002 | Gonzalez | G06Q 10/087 705/28 |

(Continued)

FOREIGN PATENT DOCUMENTS

| | | |
|---|---|---|
| JP | 2007072831 | 3/2007 |
| WO | 2002019202 | 3/2002 |

(Continued)

OTHER PUBLICATIONS

Print to 3D, URL: http://web.archive.org/web/20150111233142/http://www.printo3d.com/ published on Jan. 8, 2015.

(Continued)

*Primary Examiner* — Beniyam Menberu
(74) *Attorney, Agent, or Firm* — Brinks Gilson & Lione

(57) ABSTRACT

A method for processing an order for components includes receiving, at a server, an order that specifies one or more components for procurement and constraints for procuring the one or more components. A processor determines one or more sources capable of providing one or more of the components within the received constraints. At least one of the sources corresponds to a 3D printing facility that prints components via a 3D printing process. The processor communicates one or more orders for procuring the one or more components to the determined one or more sources.

20 Claims, 10 Drawing Sheets

(56) References Cited

U.S. PATENT DOCUMENTS

| | | | |
|---|---|---|---|
| 2002/0026379 A1* | 2/2002 | Chiarabini | G06Q 10/20 705/305 |
| 2003/0046122 A1 | 3/2003 | Seymour | |
| 2005/0030574 A1 | 2/2005 | Mcvey et al. | |
| 2005/0076317 A1 | 4/2005 | Ling et al. | |
| 2005/0114672 A1 | 5/2005 | Duncan et al. | |
| 2007/0229896 A1* | 10/2007 | Fujimori | G06F 3/1205 358/1.16 |
| 2007/0233436 A1 | 10/2007 | Ishikawa | |
| 2008/0028323 A1 | 1/2008 | Rosen et al. | |
| 2008/0151288 A1 | 6/2008 | Matsunoshita | |
| 2009/0284527 A1 | 11/2009 | Ofek et al. | |
| 2009/0319529 A1 | 12/2009 | Bartlett et al. | |
| 2011/0137892 A1* | 6/2011 | Bisson | G06F 17/50 707/722 |
| 2011/0308119 A1 | 12/2011 | Ecker et al. | |
| 2012/0019867 A1* | 1/2012 | Prati | G06F 3/1204 358/1.15 |
| 2012/0092724 A1* | 4/2012 | Pettis | B29C 64/386 358/1.15 |
| 2012/0105903 A1* | 5/2012 | Pettis | G06F 3/12 358/1.14 |
| 2012/0268772 A1* | 10/2012 | Rolleston | G06F 3/1208 358/1.15 |
| 2012/0326356 A1 | 12/2012 | Martin | |
| 2013/0024545 A1 | 1/2013 | Sheppard et al. | |
| 2013/0124151 A1 | 5/2013 | Mech et al. | |
| 2013/0132273 A1* | 5/2013 | Stiege | G06Q 20/14 705/41 |
| 2013/0176312 A1 | 7/2013 | Schouwenburg et al. | |
| 2013/0235037 A1 | 9/2013 | Baldwin et al. | |
| 2013/0297320 A1 | 11/2013 | Buser et al. | |
| 2013/0329258 A1 | 12/2013 | Pettis et al. | |
| 2014/0058959 A1* | 2/2014 | Isbjornssund | G06F 21/10 705/310 |
| 2014/0115345 A1 | 4/2014 | Maetz et al. | |
| 2014/0122544 A1 | 5/2014 | Tran et al. | |
| 2014/0156053 A1* | 6/2014 | Mahdavi | B29C 67/0059 700/119 |
| 2014/0193039 A1* | 7/2014 | Wexler | G01C 11/04 382/106 |
| 2014/0279177 A1 | 9/2014 | Stump | |
| 2014/0283104 A1* | 9/2014 | Nilsson | G06F 21/10 726/26 |
| 2014/0288699 A1 | 9/2014 | Williams et al. | |
| 2014/0309765 A1 | 10/2014 | Blanchfield | |
| 2015/0021830 A1 | 1/2015 | Yerazunis et al. | |
| 2015/0052025 A1* | 2/2015 | Apsley | G06Q 30/0635 705/26.81 |
| 2015/0057784 A1 | 2/2015 | Butler et al. | |
| 2015/0112644 A1 | 4/2015 | Schmidt | |
| 2015/0120806 A1 | 4/2015 | Lippincott | |
| 2015/0142153 A1 | 5/2015 | Chun et al. | |
| 2015/0151492 A1 | 6/2015 | Schmidt | |
| 2015/0205544 A1* | 7/2015 | Webb | G06F 3/126 358/1.15 |
| 2016/0107234 A1 | 4/2016 | Craeghs et al. | |

FOREIGN PATENT DOCUMENTS

| | | |
|---|---|---|
| WO | 2012146943 A2 | 11/2012 |
| WO | 2013013146 A1 | 1/2013 |
| WO | 2015116336 | 8/2015 |

OTHER PUBLICATIONS

3D Model Repositories, URL: https://web.archive.org/web/20150202205657/http://3dprintingforbeginners.com/3d-model-repositories/, published on Feb. 2, 2015.

Examiner's 1st report for Australian Application No. 2016200186, dated Oct. 6, 2016.

Examiner's 2nd report for Australian Application No. 2016200186, dated Feb. 8, 2017.

Examination Report No. 1 for Australian Application No. 2017232190, dated Sep. 14, 2018, pp. 1-6.

* cited by examiner

THREE-DIMENSIONAL OBJECT STORAGE, CUSTOMIZATION, AND PROCUREMENT SYSTEM

BACKGROUND

Field

This application relates to 3D printing. In particular, this application describes a system that facilities three-dimensional object storage, customization, and procurement of components.

Description of Related Art

Three-dimensional (3D) printing is a process of making a three-dimensional solid object of virtually any shape from a digital model. 3D printing is achieved using an additive process, where successive layers of material are laid down in different shapes.

In the last decade, the cost of 3D printers has dropped dramatically, making 3D printing widely available. The variety in the types of 3D printers and their capabilities has also increased. For example, a variety of layering technologies are employed by different printers, such as extrusion, wire, and granular to name a few. Some materials utilized by 3D printers include thermoplastics, metal alloys, plaster, and paper. Some printers are capable of printing relatively large objects, while others are capable of printing objects with complex geometries.

A typical workflow for printing a 3D model begins with a designer in a design house creating a digital model of an object using computer aided design (CAD) software. Once the model is ready, the designer initiates a print operation to print the design to a 3D printer that is connected to the CAD system.

The design house may have any number of designers working on models and any number of 3D printers available for printing. However, certain models may only be printable on certain 3D printers. Thus, a designer may have to transfer the model files to a computer to which a 3D printer capable of printing the model is attached.

On the other hand, procurement of components can be a time consuming process. A typical purchaser has to manually search for suppliers capable of providing the desired components. Then the purchaser has to compare lead-times, costs, and other factors in selecting a supplier. In some instances, the purchaser may only be interested in obtaining a few components or only one component. Some suppliers may not be interested in fulfilling such small orders. Others suppliers may simply be out of stock an unable to deliver the component within a desired lead-time. These and other issues could make obtaining the components difficult.

BRIEF SUMMARY

Methods, systems, and computer-readable media are provided that facilitate three-dimensional object storage, customization, and procurement.

In one aspect, a method for processing an order for components includes receiving, at a server, an order that specifies one or more components for procurement and constraints for procuring the one or more components. A processor determines one or more sources capable of providing one or more of the components within the received constraints. At least one of the sources corresponds to a 3D printing facility that prints components via a 3D printing process. The processor communicates one or more orders for procuring the one or more components to the determined one or more sources.

In a second aspect, a system for processing an order for components is provided. The system includes a server and a processor. The server is configured to receive an order that specifies one or more components for procurement and constraints for procuring the one or more components. The processor is in communication with the server and is configured to determine one or more sources capable of providing one or more of the components within the received constraints. At least one of the sources corresponds to a 3D printing facility that prints components via a 3D printing process. The processor is further configured to communicate one or more orders for procuring the one or more components to the determined one or more sources.

In a third aspect, a non-transitory machine-readable storage medium includes instruction code for processing an order for components. The code is executable by a machine for causing the machine to receive an order that specifies one or more components for procurement and constraints for procuring the one or more components, and to determine one or more sources capable of providing one or more of the components within the received constraints. At least one of the sources corresponds to a 3D printing facility that prints components via a 3D printing process. The code also causes the machine to communicate one or more orders for procuring the one or more components to the determined one or more sources.

DETAILED DESCRIPTION

Figure 1:
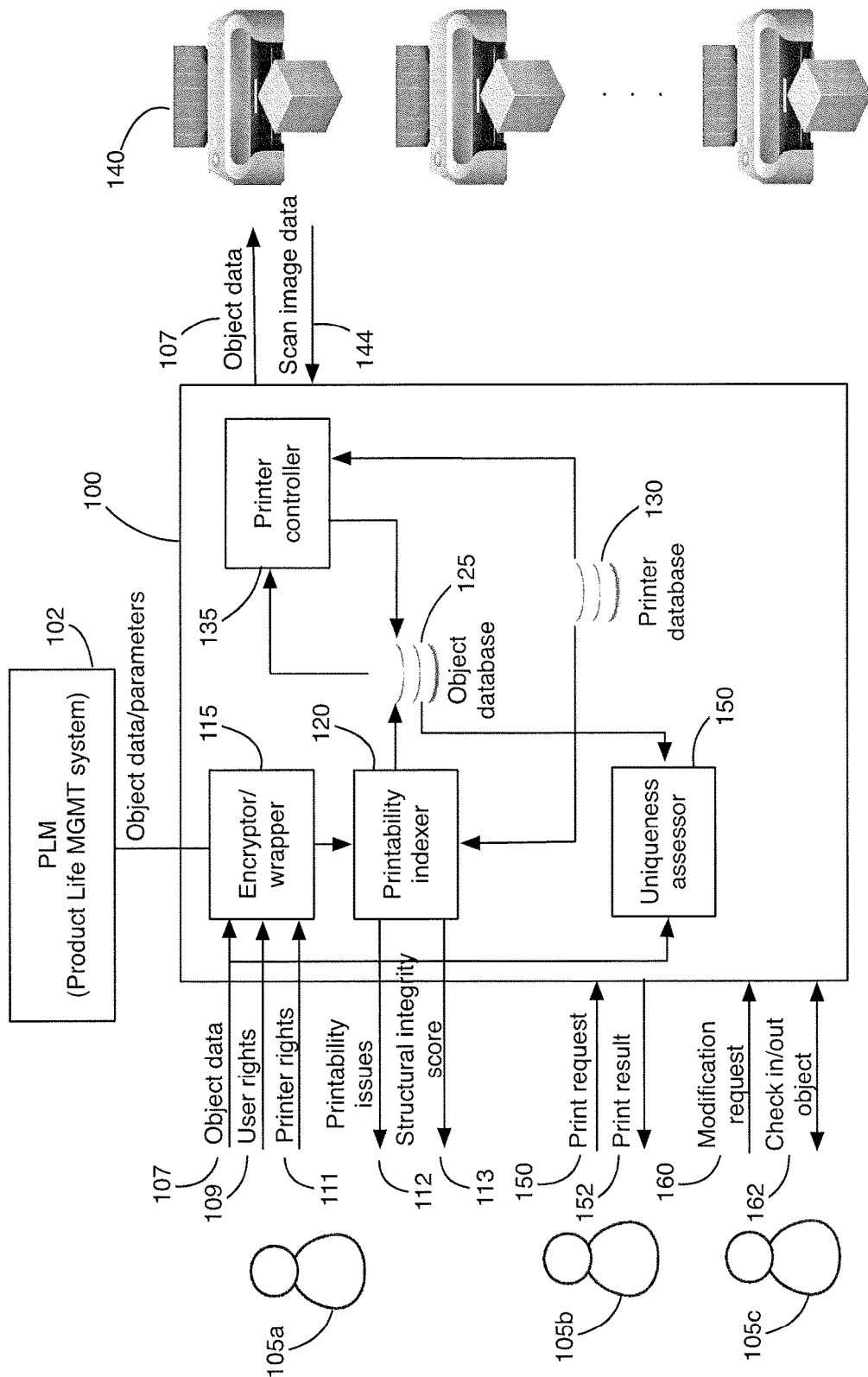
FIG. 1 illustrates an exemplary system for routing object data that defines a 3D object to a 3D printer.

Some of the embodiments described below overcome the problems above by providing a networked system that is capable of effortlessly routing a 3D object model to one or more 3D printers capable of printing the 3D model. Other embodiments provide a procurement system that is configured to automatically find a source or supplier capable of sourcing a component within certain purchase constraints. In some instances, when only a few components are required and/or where the purchaser is willing to pay a premium for a quick delivery on a hard to find component, the components may be sourced from one or more 3D printing facilities FIG. 1 illustrates an exemplary system 100 for routing object data 107 that defines a three-dimensional (3D) object to a 3D printer 140. The system 100 includes an encryptor/file wrapper 114, a printability indexer 120, a printer controller 135, an object database 125, and a printer database 130. Generally, users 105 interact with the system to upload object data 107, modify the object data 107, and print an object defined by the object data 107 on printers 140 capable of printing the object.

The system 100 may reside in the cloud. That is, the system 100 may correspond to a computer system with server capabilities that is connected to the Internet. The modules of the system 100 may also reside on different computer systems that are networked together to facilitate performance of the functions performed by the system 100. In this regard, the computer systems may include one or more network interfaces that facilitate communications via a network. Each computer system may correspond to an Intel®, AMD®, or PowerPC® based computer or a different computer. The computer systems may include an operating system, such as, a Microsoft Windows®, Linux, Unix® or other operating system.

To facilitate user interaction with the system 100, the system 100 may include a web server (not shown) that generates web pages that allow users 105 to interact with the system 100. For example, the web server may generate one or more web pages that facilitate uploading object data 107 that defines a 3D object along with various rights that control access to the object data 107. Web pages that facilitate visualization, modification, and printing of the object defined by the object data 107 may also be provided.

In alternative implementations, the system 100 may include an interface that facilitates communications with a product life cycle management (PLM) system 102. The PLM system 102 may correspond to a system that manages the entire lifecycle of a given product or products from inception, through engineering design and manufacture, to service and disposal of manufactured products. For example, the PLM system 102 may correspond to a PLM system such as Teamcenter® manufacture by Siemens Product Lifecycle Management Software Inc. The PLM system 102 may include a web services interface or a different interface that facilitates access to data stored within the PLM system 102.

Data stored within the PLM system 102 may include information that describes various aspects of a given object or product. Table 1 illustrates an exemplary record that includes attributes that may be stored in the printer database.

TABLE 1

| Object | 3D Data | Material type | Materials | Min/max Thickness (inches) | Temperature (C.) | Pressure (bar) |
|---|---|---|---|---|---|---|
| Object 1 | 3D data for object 1 | Plastic | plastic, resin | .1-.5 | 100 | 35 |
| Object 2 | 3D data for object 2 | Ceramic | plastic, metal, ceramics | .01-.1 | 1000 | 50 |

As illustrated, a given record in the database may specify 3-D object data for one or more products along with object requirements associated with the objects. The object requirements may include material-type information that specifies a type or types of material necessary for manufacturing the object, minimum and maximum material thicknesses of the objects, and other dimensional information of the objects. Other information such as environmental conditions within which the object is intended to operate, such as temperature and pressure, may be specified within the PLM system 102. The information provided by the PLM system 102 may facilitate determining a structural integrity score 113 that represents the structural integrity of the object or objects.

As noted above, the system 100 is configured to communicate object data 107 to one or more printers 140. A given printer 140 may, for example, reside within the same office or building as the system 100, or within the facility in which the user 105a that uploaded the original object data 107 resides. In other instances, the printer 140 may be provided by a third-party service. In this case, the system 100 may be configured to follow network protocol procedures that may be in place that facilitate the transfer of object data 107 to the third-party service. For example, the system 100 may be configured to specify a user name, password, etc., that facilitates access to the printers of the third party.

Figure 2:
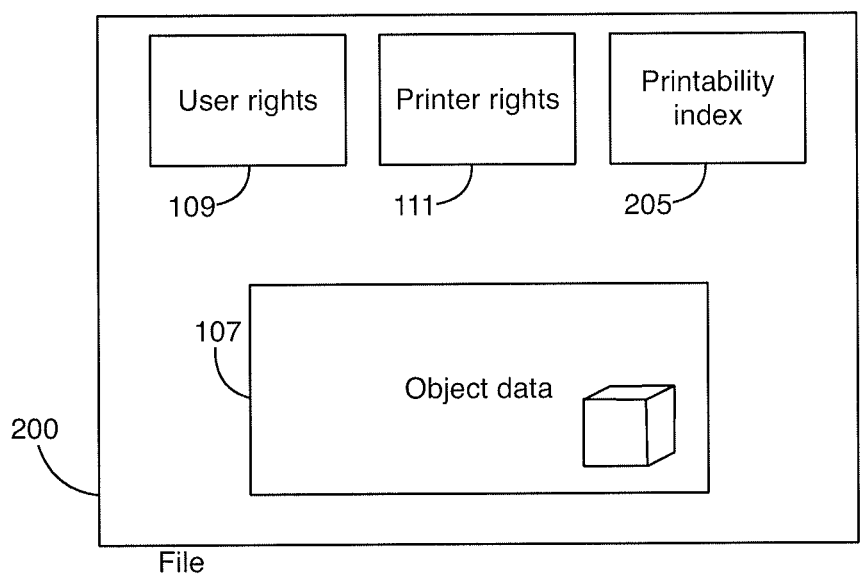
FIG. 2 illustrates an exemplary representation of a file that may wrap the object data.

Turning to the system 100, the encryptor/wrapper 115 includes code, logic, or other circuitry that facilitates encrypting the object data 107 received from a first user 105a and wrapping the encrypted object data 107 within a file wrapper or file 200 (see FIG. 2). For example, an encryption algorithm such as AES, TKDW, or AKW, may be utilized to encrypt the object data 107.

The encryptor/wrapper 115 may associate a default set of access rights and/or a custom set of access rights with the object data 107. For example, the first user 105a may have specified user rights 109 and printer rights 111 that define the access rights to the object data 107. The encryptor/wrapper 115 may embed the user rights 109 and printer rights 111 within the file 200 as metadata.

User rights 109 may be specified by the first user 105a to control access to the object data 107 by other users 105bc. For example, the user rights 109 may define other user's 105bc ability to read, modify, and distribute the object data. The user rights 109 may define printers to which other users 105bc may source the object data 107.

The printer rights 111 may be specified by the first user 105a to control access to the object data 107 by printers 140. For example the printer rights 111 may define an ability by a printer 140 to access the object data 107, a definition of printers upon which the object defined by the object data 107 can be printed, a set duration or time that defines a time at which access to the object data will expire, and a limit as to the number of print attempts that can be performed with respect to the object data 107. Other user and printer rights may be specified.

The printability indexer 120 includes code, logic, or other circuitry that facilitates determining one or more printers 140 on which a given object may be printed. The printability indexer 120 is configured to determine object attributes such as the dimensions of the object, the structural integrity of the object, and the material requirements of the object. Determination of these attributes is discussed in more detail below. In this regard, the object attributes associated with a given object may be retrieved from the PLM system 102.

In some implementations, the printability indexer 120 may embed data that defines the dimensional, structural, and material attributes into the file 200 that stores the object data 107. After indexing, the file 200 may be stored in the object database 125 for later printing and/or modification. In alternative implementations, the data may be stored elsewhere. For example, the data may be stored in a record of a database or in a different file. In yet other alternative implementations, the printability indexer 120 may communicate the determined information to the encryptor/wrapper 115, which may then embed the attributes into the file 200 and store the file 200 to the object database 125.

The printability indexer 120 is further configured to identify printers capable of printing objects that posses the attributes determined above. In this regard, the printability indexer 120 may search the printer database 130 for capable printers. The printer database 130 stores printer attribute data associated with one or more printers 140. Table 2 illustrates an exemplary record that includes attributes that may be stored in the printer database.

TABLE 2

| Printer | Location | Printer Type | Materials | Quantity of material | Lead time | Cost/part |
|---|---|---|---|---|---|---|
| ABC Printing Co. | Chicago | Maximus 5 3D printer | plastic, resin | 100% | 1 day | $100 |
| XYZ Printer Ltd. | New York | Integrity 7 3D printer | plastic, metal, ceramics | 50% | 10 day | $ 50 |

As illustrated, the printer attributes may include the location and type of printer 140. The printer attributes may specify the minimum and maximum size of objects that may be printed on a printer 140. The attributes may define the types of materials the printer 140 utilizes for printing objects along with the current material quantity on hand. Other printer attributes may be associated with the printers 140.

In instances where a suitable printer cannot be found, the printability indexer 120 may communicate this fact back (i.e., printability issues 112) to the user 105a. For example, the printability indexer 120 may determine that an object of a given size is not printable in the material specified by the designer. The printability indexer 120 may report this fact back to the designer. The printability indexer 120 may also communicate a structural integrity score 113 to the user 105a to provide the user 105a with an assessment of the structural integrity of the object. Determination of the structural integrity score 113 is discussed in more detail below.

In some implementations, the printability indexer 120 may be configured to suggest modifications to the object requirements to facilitate printing of the object. For example, the printability indexer 120 may determine that an object of a given size is not printable in the material selected by the designer, but that the object is printable in a different material. In this case, the printability indexer 120 may suggest the different material to the user. The printability indexer 120 may determine that the material selected for an object is not suitable for use within the environmental constraints associated with the object that are specified within the PLM system 102. In this case, the printability indexer 120 may again suggest alternative materials suitable for operating within the specified environmental constraints.

To facilitate making these determinations, the printability indexer may rely in part on material specifications that specify the dimensions, environmental conditions, etc. in which a given material is suited.

As noted above, the object database 125 stores one or more files that store the object data, user rights, printer rights, and printability index. Storage of the object data facilitates printing of the object data at a later time and/or modification of the object defined by the object data, which is described in greater detail below.

The printer controller 135 includes code, logic, or other circuitry that facilitates routing object data 107 to one or more printers 140 for printing of an object. The printer controller 135 obtains the object data 107 from the object database 125. The printer controller 135 is configured to determine whether a given printer 140 is allowed to access the object data 107. In this regard, the printer controller 135 may prohibit access to the object data 107 if one or more of the printer rights 111 are violated. For example, the printer controller 135 may deny access after a certain number of attempts have been made to print the object. The printer controller 135 may deny access if the period for access to the object data 107 has expired. The printer controller 135 may deny access if the printer 140 is not capable of printing the object.

If access to the object data 107 is allowed, the printer controller 135 communicates the object data 107 to the printer 142. In this regard, in some implementations the printer controller 135 may include code, logic, or other circuitry that facilitates decryption of the object data 107 and communication of the decrypted object data 107 to the printer 140. In other instances, the printer 140 may include the decryption logic, in which case a pre-shared decryption key may be provided to the printer 140 ahead of time, or by the printer controller 135 after access to the object data 107 has been allowed.

Operations of the system 100 are described with reference to the block diagrams illustrated on FIGS. 3-7. Some or all of the operations may be implemented via instruction code that resides on non-transitory computer readable storage media of a computer system. Execution of the instruction code by the computer system may cause the computer system to perform the operations described in the block diagrams.

Figure 3:
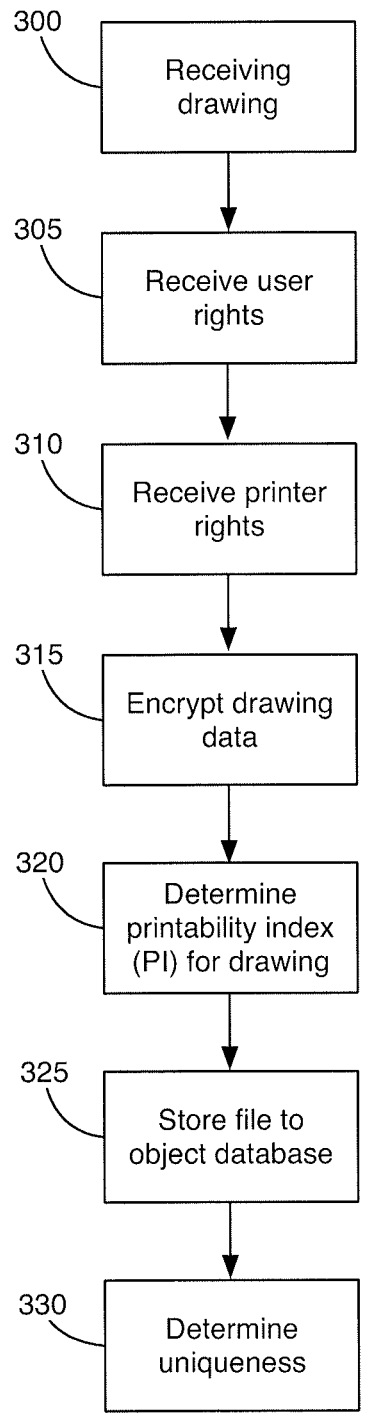
FIG. 3 illustrates a block diagram of operations that may be performed when uploading object data to the system of FIG. 1.

FIG. 3 illustrates a block diagram of operations that may be performed when initially uploading object data 107 to the system 100. At block 300, the system 100 may receive the object data 107. For example, the system 100 may provide a web page that facilitates uploading the object data to the system 100. A first user 105a may login to the system 100, select an upload option, and then initiate an upload operation.

At block 305, user rights 109 may be received. For example, a web page that identifies various user right options may be communicated to the first user 105a. The first user 105a may then specify user rights, such as identification information that identifies users that should have access to the object data 107. The type of access provided for each user may be specified. For example, rights that define whether the user can modify, print, and/or distribute the object data 107 may be specified. Other user rights 109 may be specified.

At block 310, printer rights 111 may be received. For example, a web page that identifies various printer right options may be communicated to the first user 105a. Printer right information communicated to the system 100 may define an ability by a printer 140 to access the object data 107, a definition of printers 140 upon which the object can be printed, a set duration or time that defines a time at which access to the object data 107 will expire, and a limit as to the number of print attempts that may be performed with respect to the object data 107.

At block 315, the object data 107 may be wrapped within a file 200 and encrypted using an encryption algorithm, such as AES, TKDW, or AKW. Data that defines the user rights 109 and printer rights 111 may be embedded into the file 200.

At block 320, the printability index of the object defined by the object data 107 may be determined. Determination of the printability index is best understood with reference to FIG. 4.

Figure 4:
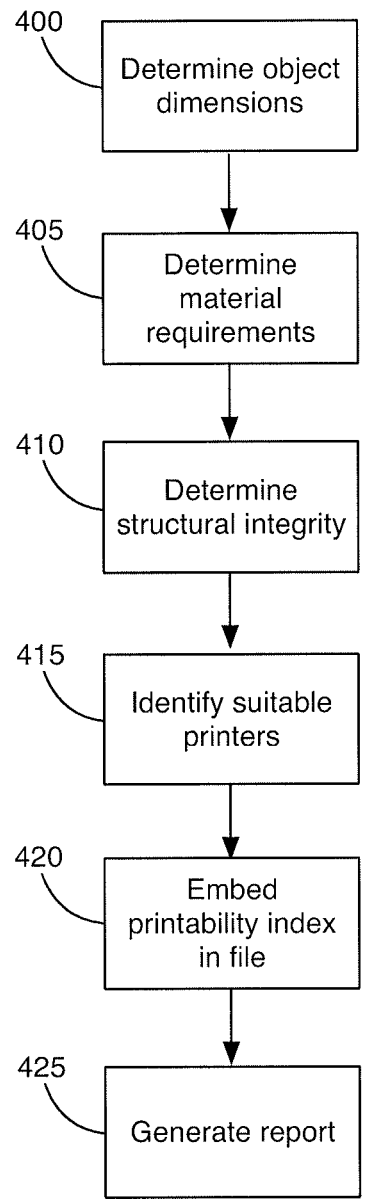
FIG. 4 illustrates a group of exemplary operations that facilitate determination of a printability index of a 3D object associated with the object data.

Turning to FIG. 4, at block 400 the dimensions of the object defined by the object data 107 may be determined. The dimensions of the object may correspond to the bounds of the object. That is, the smallest bounding cube within which the printed object will fit. The bounding volume may be determined by analyzing the coordinates of the various primitives in the object data 107 to determine the extents of the object defined by the object data 107. The dimensions and/or the bounds of the object may have been provided to the system by the first user 105a and/or retrieved from the PLM system 102.

At block 405, the material requirements of the object defined by the object data 107 are determined. The material requirements may specify the type and quantity of material required to print the object. The first user 105a may have previously specified the type of material. In addition or alternatively, material type information may be retrieved from the PLM system 102. In yet other implementations, a choice of materials may be available, in which case the printability indexer 120 may determine the materials that are most suitable for printing of the object.

At block 410, the structural integrity of the object defined by the object data 107 is determined. The structural integrity of the object may correspond to a score that represents the structurally stability of the object. For example, a higher score may indicate a high degree of structural stability.

In determining the score, the printability indexer 120 may analyze various aspects of information associated with the object. For example, dimensions of the object may be analyzed to determine the weakest points of the object, such as minimum and maximum material thickness information that specifies those locations of the object that are thickest and/or thinnest. Other dimensions, such as the angles at which surfaces converge may be taken into consideration. The dimensions may be specified in the object data 107 provided by the first user 105a. In addition or alternatively, dimension information associated with the object may be provided by the PLM system 102.

Object requirements may be analyzed to assess the objects structural integrity. For example, the material-type information, environmental information, and/or other information provided by the PLM system may be utilized to assess the objects structural integrity. As an example, the PLM information may specify that an object is to be formed of material ABC, and may also specify that the object is intended to operate at 100 C. On the other hand, material specification information stored and/or provided to the printability indexer 120 may indicate that material ABC is not suitable for use over 95 C. As a result, the printability indexer 120 may assess a low structural integrity score for the object.

At block 415, printers 140 capable of printing objects that possess the attributes determined above are identified. For example, the printability indexer 120 may search the printer database 130 for capable printers. The printer database 130 stores printer attribute data associated with various printers 140. For example, the printer attributes may include the location and type of the printer 140. The printer attributes may specify the minimum and maximum size of objects that may be printed on a printer 140. The attributes may define the types of materials the printer 140 utilizes for printing objects along with the current material quantity.

At block 420, a printability index 205 that defines the dimensional, structural, and material requirements determined above may be embedded into the file 200 associated with the object data 107.

At block 425, a report that specifies the attributes determined above may be generated. The report may list various printers 140 capable of printing the object defined by the object data 107. Where the object cannot be printed, the report may specify the reasons why, such as whether there are structural or material issues. Where the object is not printable for structural reasons, the report may specify those aspects of the object that are causing the problem. The report may be communicated back to the first user 105a so that the first user 105a can make corrections as necessary.

Returning to FIG. 3, at block 325 the file 200 is stored to the object database 125. This facilitates later access to the object data 107 stored in the file 200.

At block 330, the uniqueness of the object defined by the object data 107 may be assessed. Determination of the uniqueness of the object is best understood with reference to FIG. 5.

Figure 5:
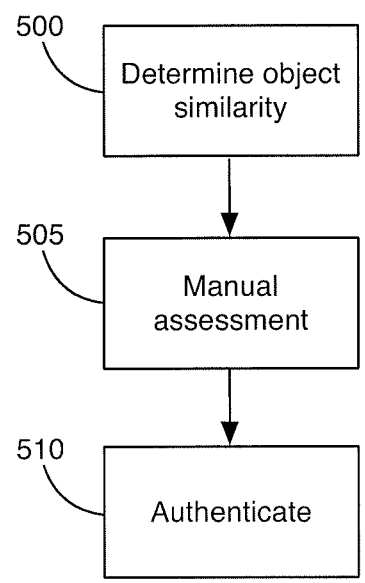
FIG. 5 illustrates a group of exemplary operations that facilitate determination of a uniqueness of the 3D object.

Turning to FIG. 5, at block 500 the new object defined by the object data 107 may be compared with object data for existing objects to determine how similar the new object is to existing objects. In this regard, the existing object data may comprise 3D object data for objects previously submitted to the system 100. In alternative embodiments, the existing 3D object data may be sourced from one or more third-party servers that store 3D object data.

Similarity may be determined by first analyzing the overall surface shape of the respective objects to determine the scale of the objects and the number of polygons of the objects. The density and other factors may also be considered. After comparison of these attributes, a similarity score that represents the similarity between new object and a given object that already exists is generated. To improve identification accuracy, the mesh sizes for the compared objects may be reduced to ensure that similar but lower resolution models are correctly compared.

In some implementations, comparison of the shape is performed independent of size. That is, surface or feature similarities are compared as opposed to size similarity. Surface similarity may be determined by breaking down a given object in subsections or blocks. The subsections or blocks of the object may be compared to subsections or blocks of other objects. When a high number of subsections/blocks for a given object match those of another object, an inference may be drawn that the objects are similar.

At block 505, if the similarity score falls within a range at which the similarity cannot be automatically determined, the new object may be marked as requiring a manual assessment to determine how similar the object is to an existing object. If the similarity score is below a lower threshold, an automatic determination may be made that the new object is not similar to a given existing object. If the similarity score exceeds an upper threshold, an automatic determination may be made that the new object is similar to a given existing object.

At block 510, if the similarly score determined at step 500 or the manual assessment at block 505 indicates that the new object is unique, a certificate indicating the uniqueness of the object may be associated with the object. For example, a certificate of uniqueness may be embedded within the file 200 that stores the object data 107.

Determination of the uniqueness of the object may be a factor in determining whether there are intellectual property rights associated with the object that warrant protection. The uniqueness certificate may also provide a degree of comfort to others that may be modifying or printing the object that they are not infringing another's intellectual property rights when modifying or printing the object.

Figure 6:
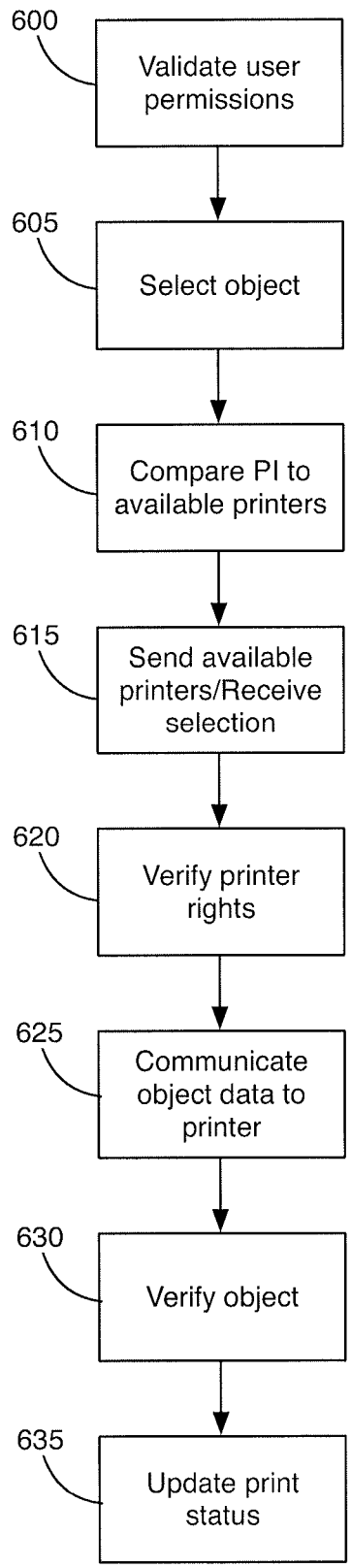
FIG. 6 illustrates a group of exemplary operations that may be performed when printing object data stored in an object database of the system.

FIG. 6 illustrates a block diagram of operations that may be performed when printing object data 107 stored in the object database 125. At block 600, an authentication web page may be presented to a second user 105*b*. The second user 105*b* may specify a user name and password. After validation of the second user 105*b*, the system 100 may search the object database 125 for any files 200 that have user rights 109 that authorize the second user 105*b* access to the object data 107 stored therein. For example, a list of files to which the second user 105*b* has access may be communicated to the second user 105*b*.

At block 605, a selection of one or more objects is received. For example, the second user 105*b* may select one or more objects for printing.

At block 610, the printability index for each object is compared with the printer attributes stored in the printer database 130 to identify one or more printers capable and available for printing of the object.

At block 615, a list of capable printers 140 is communicated to the second user 105*b*. The list may specify various attributes associated with each capable printer 140. For example, the location and type of each printer 140, the types of materials that each printer 140 utilizes, the cost associated with printing a given object on each printer 140, etc., may be communicated to the second user 105*b*. Other attributes may be provided. The second user 105*b* may select a printer 140 from the list of available printers.

At block 620, the printer rights 109 for the selected printer 140 are evaluated to determine whether the printer 140 has print rights to the object defined by the object data 107. For example, the printer controller 135 may analyze the printer rights 111 stored in the file 200 associated with the selected object to determine whether the time for printing the object has lapsed or whether the number of print attempts has exceeded the print attempt limit specified in the printer rights 111. Other rights may be evaluated to determine whether the printer 140 has the appropriate rights.

In an alternative implementation, the printer rights 111 may be confirmed for the selected object prior to block 615. In this case, the available printers communicated to the second user 105*b* would represented those printers 140 that are capable of printing the object defined by the object data 108, and which have the appropriate printer rights 111.

At block 625, if the printer rights 111 are confirmed at block 620, the object data 107 associated with the selected object is communicated to the selected printer 140 for printing. For example, the printer controller 135 may obtain the selected object data from the object database 125. The printer controller 135 then communicates the object data to a printer 140.

At block 630, the printed object may be verified. For example, a 3D scan of the object may be performed via an infrared or other type of 3D scanning. The operator/third party in control of the printer may perform the 3D scan. The scanned image data 144 may then be uploaded to the system 100. The printer controller 135 may then compare the scanned image data 144 to the original object defined by the object data 107 stored in the object database 125 to determine whether the printing results are successful. The results may be communicated back to the second user 105*b* and/or the printer 140 so that the appropriate actions may be taken.

At block 635, the print status of the file 200 associated with the object is updated. For example, the print attempt count in the printer rights 111 may be updated to reflect that a print attempt was made.

Figure 7:
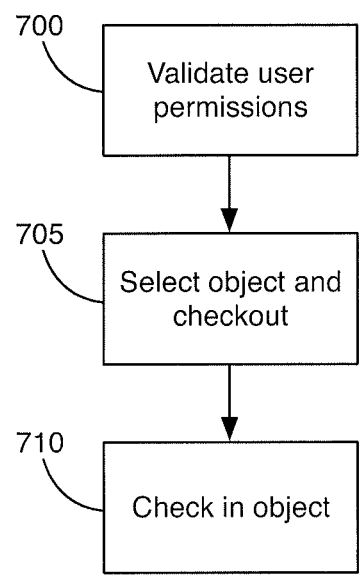
FIG. 7 illustrates a group of exemplary operations that may be performed when modifying object data stored in the object database.

FIG. 7 illustrates a block diagram of operations that may be performed when modifying object data 107 stored in the object database 125. At block 700, an authentication web page may be presented to a third user 105*c*. The third user 105*c* may specify a user name and password. After validation of the third user 105*c*, the system 100 may search the object database 125 for any files 200 that have user rights 109 that authorize the third user 105*c* access to the object data 107 stored therein. For example, a list of files to which the third user 105*c* has access may be communicated to the third user 105*c*.

At block 705, a selection of one or more objects is received. For example, the third user 105*c* may select one or more objects for modification. The selected object may be checked out for modification. For example, the object data 107 stored within the file 200 may be decrypted and communicated to the third user 105*c*. The third user 105*c* may modify the object defined by the object data 107 via any number of CAD programs.

At block 710, the modified data that defines the modified object data may be uploaded to the system 100 and stored back into the file 200. In some implementations, objects uploaded to the system 100 are version tracked, which may facilitate undoing changes made by a given user. In yet other implementations, the system 100 may represent the changes to the original object data 107 in terms of differences from the original object data 107. This simplifies version control and in some cases may result in decreased storage requirements for a given object.

In some instances, the object modified by the third user 105*c* may correspond to a stand-alone object. In other instance, the object modified by the third user 105*c* may be part of a larger assembly. In this regard, the first user 105*a* may have provided object data 107 for several objects of the assembly. The first user 105*a* may have restricted access to some of the objects via the user rights 109. For example, the user rights 109 on certain objects may be set to prevent modification of the object by other users 105*c*. The user rights 109 for other objects may have been set to allow modification. This facilitates customization of certain parts of the assembly. For example, a first user 105*a* may upload object data that defines a housing of some kind and a portion of the housing may be modifiable by others to place a logo on the housing.

Figure 8:
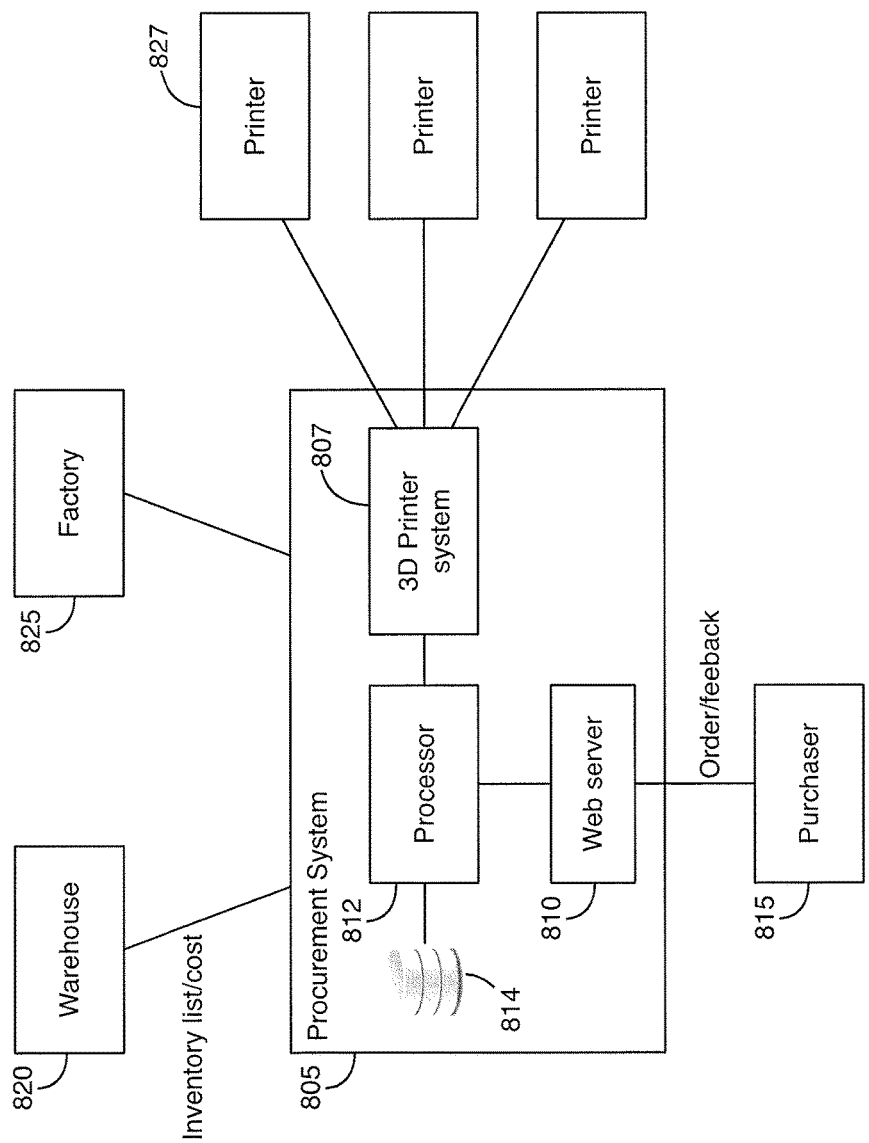
FIG. 8 illustrates an exemplary environment that includes a procurement system for procuring components of an order from a variety of sources.

The system 100 described above or features of the system 100 may be adapted to work in conjunction with other systems. For example, the environment of FIG. 8 illustrates a procurement system 805 that utilizes aspects of the system 100 to facilitate procuring components for an order. The system 805 includes a processor, a web server, and a 3-D printer system 807. The 3-D printer system 807 may correspond to the system 100 or may implement certain features of the system, 100.

In general, the system 805 is configured to receive an order for one or more components. For example, a purchaser 815 may submit an order via a web site generated by the web server 810. The order may specify certain constraints, such as maximum costs, expected lead-times, etc., for one or more of the components. In some instances, the constraints may specify a type of material from with a given component should be made or certain structural requirements for the component.

The components may be sourced from a variety of sources. For example, the components may be sourced from one or more warehouses 820, factories 825, 3D printing facilities 827, or other suppliers. Some of the components may not be available from certain sources. Other components may be available from more than one source, but the cost and lead-time for obtaining the component from the sources may vary. The system 805 is configured to procure the requested components from the various sources in such a way as to meet or attempt to meet the constraints in the order.

Figure 9:
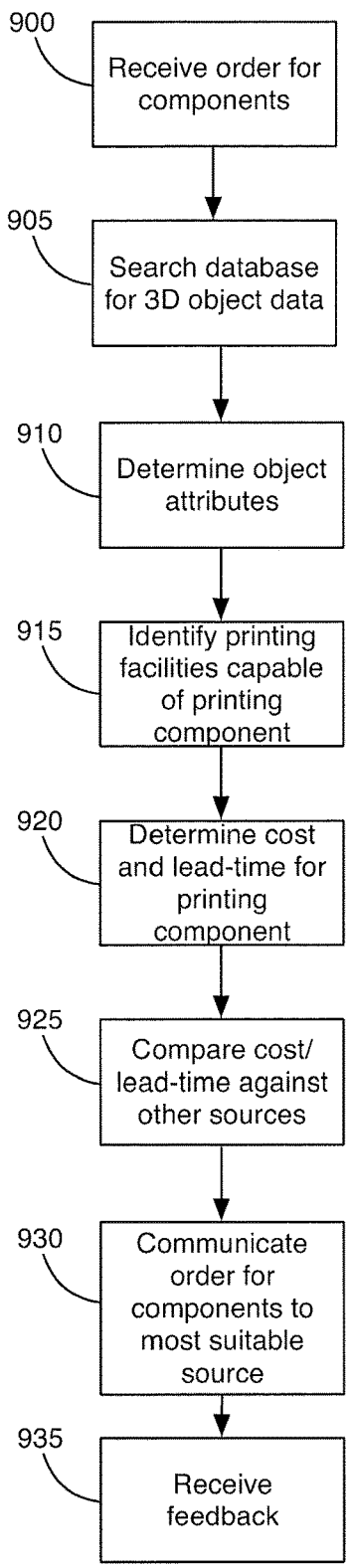
FIG. 9 illustrates a block diagram of operations that may be performed by the procurement system.

FIG. 9 illustrates more specific operations that may be performed by the procurement system 805. At block 900, the procurement system 805 may receive the order mentioned above. The order may come by way of a web site or may be communicated to the procurement system 805 in a different manner. The order may specify one or more components and one or more constraints, such as costs and lead-times associated with the components.

At block 905, a database with 3D object data may be searched to determine whether 3D object data that defines one or more of the requested components is available. For example, the database may correspond to the object database 125 described above. In addition or alternatively, the procurement system 805 may communicate with a PLM system such as the PLM system 102 described above to obtain 3D object data.

At block 910, object attributes associated with the components may be determined. For example, operations such as those described above with reference to FIG. 4 may be performed to determine the dimension of the object, the material requirements, structural integrity, etc. In some implementations, certain object attributes may be overridden by constraints in the order. For example, 3D object data may be available for printing a component in a first material. But the order may request that the component be printed in a different material.

At block 915, the 30 printing system 807 may identify printers capable of printing one or more of the components. For example, the operations in block 415 of FIG. 4 may be performed to identify suitable printers.

At block 920, cost, lead-time, and other parameters associated with procurement of each component may be determined. For example, the procurement system 805 may initially identify sources that may provide the requested component. The procurement system 805 may then determine costs and lead-times for obtaining the components from those sources capable of providing the component. Data the defines whether a given source has the ability to source a given component may be to stored in a database 814 in communication with the processor. The database 814 may also specify costs, lead-times, and other information related to components sourced from a given supplier.

In some implementations, the processor 812 may be configured to periodically request the information stored in the database 814 from the various sources. In addition or alternatively, the processor may communicate a request for the information to the various sources after the order from the purchaser 815 is received.

At block 925, the procurement system 925 may select one or more sources for providing each component of the order by comparing the respective costs and lead-times. For example, the order may specify a short lead-time for obtaining a given component, but may also specify a relatively high limit for the cost for the component. Such a component may, therefore, be sourced from a warehouse, if available. Alternatively, the component may be sourced from a 3D printing facility capable of delivering the component in a short time frame.

At block 920, after the sources for the various components have been determined, the procurement system 805 may communicate various component orders to the identified sources. The sources may then manufacture or otherwise obtain the components and send them directly to the purchaser 815.

In some implementations, the system 805 may be configured to receive feedback related to the procurement of components. For example, at block 935, the purchaser 815 may submit feedback information related to a particular component, such as whether the component was defective, how long it took to receive the component, etc. The processor 812 may relate this information with the source for the component and take this information in determining whether to source a given component from the source for a future order. For example, the feed back may be stored in the database 814 for use in making later determinations.

Figure 10:
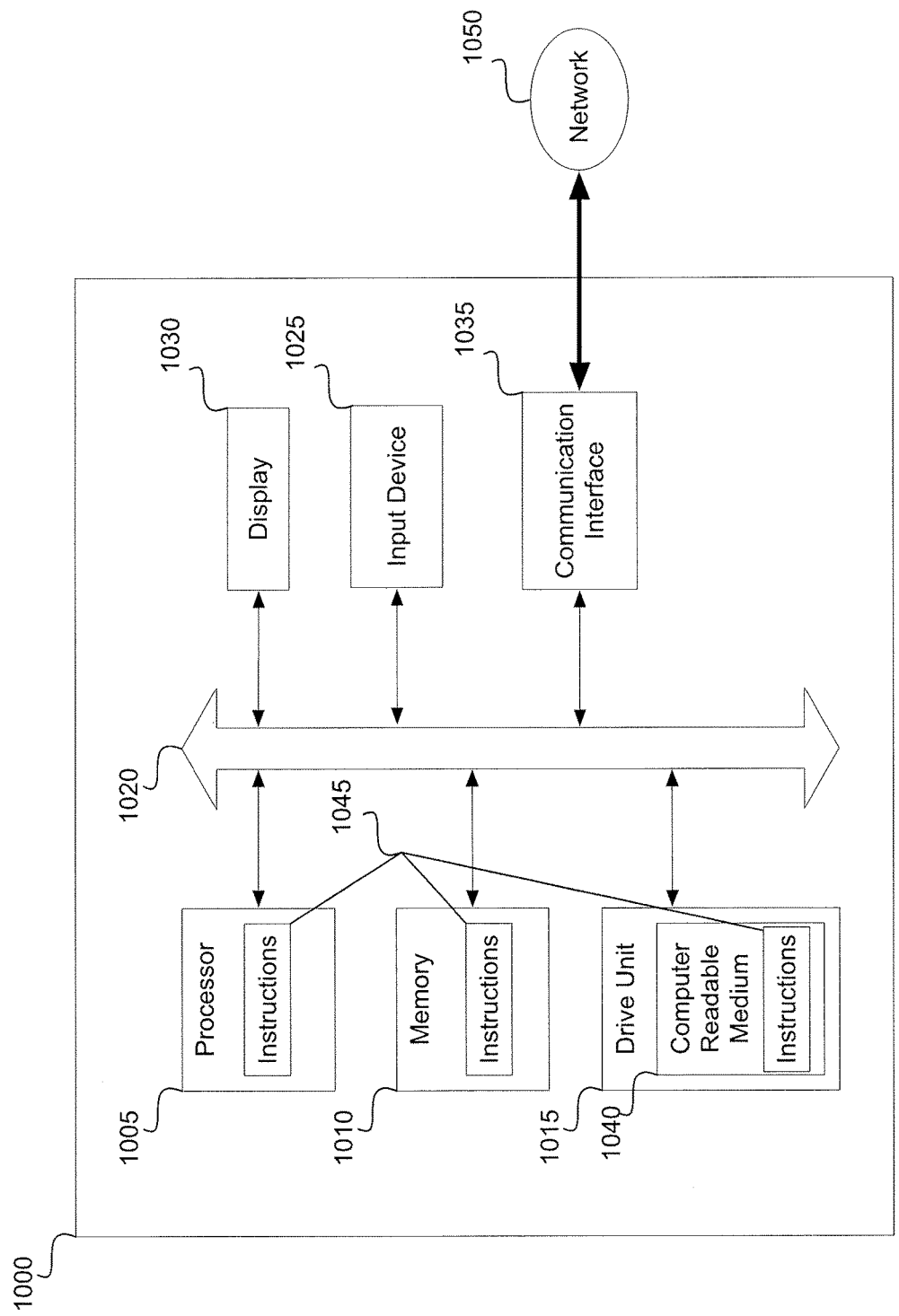
FIG. 10 illustrates a computer system 1000 that may implement various modules of system.

FIG. 10 illustrates a computer system 1000 that may form part of or implement the encryptor/wrapper 115 printability indexer 120, printer controller 120, uniqueness assessor 150, processor 812 of the procurement system 805, or any other module referenced herein. The computer system 1000 may include a set of instructions 1045 that the processor 1005 may execute to cause the computer system 1000 to perform any of the operations described above. The computer system 1000 may operate as a stand-alone device or may be connected, e.g., using a network, to other computer systems or peripheral devices.

In a networked deployment, the computer system 1000 may operate in the capacity of a server or as a client-user computer in a server-client user network environment, or as a peer computer system in a peer-to-peer (or distributed) network environment. The computer system 1000 may also be implemented as or incorporated into various devices, such as a personal computer or a mobile device, capable of executing the instructions 1045 (sequential or otherwise) that specify actions to be taken by that machine. Further, each of the systems described may include any collection of sub-systems that individually or jointly execute a set, or multiple sets, of instructions to perform one or more computer functions.

The computer system 1000 may include one or more memory devices 1010 on a bus 1020 for communicating information. In addition, code operable to cause the computer system to perform any of the operations described above may be stored in the memory 1010. The memory 1010 may be a random-access memory, read-only memory, programmable memory, hard disk drive or any other type of memory or storage device.

The computer system 1000 may include a display 1030, such as a liquid crystal display (LCD), a cathode ray tube (CRT), or any other display suitable for conveying information. The display 1030 may act as an interface for the user to see the functioning of the processor 1005, or specifically as an interface with the software stored in the memory 1010 or in the drive unit 1015.

Additionally, the computer system 1000 may include an input device 1025, such as a keyboard or mouse, configured to allow a user to interact with any of the components of system 1000.

The computer system 1000 may also include a disk or optical drive unit 1015. The object database 125, printer database 130, and any other forms of storage referenced herein may be stored on the disk drive unit 1015. The disk drive unit 1015 may include a computer-readable medium 1040 in which the instructions 1045 may be stored. The instructions 1045 may reside completely, or at least partially, within the memory 1010 and/or within the processor 1005 during execution by the computer system 1000. The memory 1010 and the processor 1005 also may include computer-readable media as discussed above.

The computer system 1000 may include a communication interface 1035 to support communications via a network 1050. The network 1050 may include wired networks, wireless networks, or combinations thereof. The communication interface 1035 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for processing an order for components, the method comprising:

receiving, at a server, an order that specifies a plurality of components for procurement and constraints for procuring each of the plurality of components, wherein the constraints include a structural integrity score indicative of a structural integrity of the component that is determined based at least in part on one or more locations of the component that are the thinnest and one or more angles of the component at which surfaces converge;

determining, by a processor, a plurality of different sources capable of providing one or more of the plurality of components within the received constraints, wherein at least some of the sources correspond to 3D printing facilities that print components via a 3D printing process; and communicating a plurality of orders for procuring the plurality of components, each associated with one or more of the plurality of components, to the determined different sources.

2. The method according to claim 1, wherein determining the plurality of different sources capable of providing one or more of the plurality of components further comprises:

searching a database for 3D object data associated with the plurality of components.

3. The method according to claim 2, wherein the database is accessed via a product life management system.

4. The method according to claim 2, wherein for each component for which 3D object data exists in the database, the method further comprises:

determining object attributes associated with the component;

searching, by a printability indexer, a database that stores 3D printer attributes associated with 3D printing facilities for one or more 3D printers capable of printing objects that possess the determined object attributes; and if one or more capable printers are identified, communicating, by the server, a list that identifies the one or more 3D printing facilities with capable 3D printers to a user.

5. The method according to claim 1, wherein the constraints define one or more of: maximum cost information, and delivery lead-time information associated with each of the plurality of components.

6. The method according to claim 1, further comprising receiving, by the processor and for each of the plurality of different sources, at least one of: inventory information, cost information, and delivery lead-time information associated with components provided by the source.

7. The method according to claim 1, further comprising determining, for each of the plurality of components, a source capable of providing the component at or below a maximum cost associated with the component and within a delivery lead time associated with the component.

8. The method according to claim 1, further comprising communicating an order for communicating at least one of the plurality components to the 3D printing facility.

9. A system for processing an order for components, the system comprising:

a server configured to receive an order that specifies a plurality of components for procurement and constraints for procuring the plurality of components, wherein the constraints include a structural integrity score indicative of a structural integrity of the component that is determined based at least in part on one or more locations of the component that are the thinnest and one or more angles of the component at which surfaces converge and each component is associated with data that defines a 3D object model of the component and access rights to the 3D object model; and a processor in communication with the server configured to:

determine a plurality of different sources capable of providing one or more of the plurality of components within the received constraints, and that have been granted access rights to the 3D object models associated with the one or more of the plurality of components, wherein at least some of the sources correspond to 3D printing facilities that print components via a 3D printing process; and communicate a plurality of orders for procuring the plurality of components, each associated with one or more of the plurality of components, to the determined different sources.

10. The system according to claim 9, wherein in determining the plurality of different sources capable of providing one or more of the plurality of components the processor is further configured to:

search a database for 3D object data associated with the plurality of components.

11. The system according to claim 10, wherein the database is accessed via a product life management system.

12. The system according to claim 10, wherein for each component for which 3D object data exists in the database, the processor is further configured to determine object attributes associated with the component; wherein the system further includes a subsystem that searches a database that stores 3D printer attributes associated with 3D printing facilities for one or more 3D printers capable of printing objects that possess the determined object attributes; and wherein the server is further configured to communicate a list that identifies the one or more 3D printing facilities with capable 3D printers to a user when one or more capable printers are identified by the subsystem.

13. The system according to claim 9, wherein the constraints define one or more of: maximum cost information, and delivery lead-time information associated with each of the plurality of components.

14. The system according to claim 9, wherein for each of the plurality of different sources the processor is further configured to receive at least one of: inventory information, cost information, and delivery lead-time information associated with components provided by the source.

15. The system according to claim 9, wherein for each of the plurality of components, the processor is further configure to determine a source capable of providing the component at or below a maximum cost associated with the component and within a delivery lead time associated with the component.

16. The system according to claim 9, wherein the processor is further configured to communicate an order for communicating at least one of the plurality of components to the 3D printing facility.

17. A non-transitory machine-readable storage medium having stored thereon a computer program comprising at least one code section for processing an order for components, the at least one code section being executable by a machine for causing the machine to perform acts of:

receiving an order that specifies a plurality of components for procurement and constraints for procuring the each of the plurality of components, wherein the constraints include a structural integrity score indicative of a structural integrity of the component that is determined based at least in part on one or more locations of the component that are the thinnest and one or more angles of the component at which surfaces converge;

determining a plurality of different sources capable of providing one or more of the plurality of components within the received constraints, wherein at least some of the sources correspond to 3D printing facilities that print components via a 3D printing process; and communicating a plurality of orders for procuring the plurality of components, each associated with one or more of the plurality of components, to the determined different sources.

18. The non-transitory machine-readable storage medium according to claim 17, wherein in determining the plurality of different sources capable of providing one or more of the plurality of components, the code section is further executable by the machine to cause the machine to search a database for 3D object data associated with the plurality of components.

19. The non-transitory machine-readable storage medium according to claim 18, wherein the database is accessed via a product life management system.

20. The non-transitory machine-readable storage medium according to claim 18, wherein for each component for which 3D object data exists in the database, the code section is further executable by the machine to cause the machine to perform acts of:

determining object attributes associated with the component;

searching, by a printability indexer, a database that stores 3D printer attributes associated with 3D printing facilities for one or more 3D printers capable of printing objects that possess the determined object attributes; and if one or more capable printers are identified, communicating, by the server, a list that identifies the one or more 3D printing facilities with capable 3D printers to a user.

* * * * *